United States Patent
Zheng et al.

(10) Patent No.: US 11,627,082 B2
(45) Date of Patent: Apr. 11, 2023

(54) AUTOMATICALLY ESTABLISHING AN ADDRESS MAPPING TABLE IN A HETEROGENEOUS DEVICE INTERCONNECT FABRIC

(71) Applicant: Alibaba Group Holding Limited, Grand Cayman (KY)

(72) Inventors: Jun Zheng, Fremont (CA); Hua Sun, San Jose, CA (US); Dengcheng Zhu, San Ramon, CA (US)

(73) Assignee: Alibaba Group Holding Limited, Grand Cayman (KY)

( * ) Notice: Subject to any disclaimer, the term of this patent is extended or adjusted under 35 U.S.C. 154(b) by 110 days.

(21) Appl. No.: 17/077,898

(22) Filed: Oct. 22, 2020

(65) Prior Publication Data

US 2022/0131799 A1    Apr. 28, 2022

(51) Int. Cl.
*H04L 12/28* (2006.01)
*H04L 45/745* (2022.01)
*H04L 49/15* (2022.01)

(52) U.S. Cl.
CPC ............ *H04L 45/745* (2013.01); *H04L 49/15* (2013.01)

(58) Field of Classification Search
CPC .............................. H04L 45/745; H04L 49/15
See application file for complete search history.

(56) References Cited

U.S. PATENT DOCUMENTS

| | | | | |
|---|---|---|---|---|
| 5,649,108 A | * | 7/1997 | Spiegel | H04Q 3/66 709/241 |
| 8,090,805 B1 | * | 1/2012 | Chawla | H04L 12/00 709/240 |
| 8,422,502 B1 | * | 4/2013 | Alaettinoglu | H04L 45/38 370/395.3 |
| 8,831,010 B1 | * | 9/2014 | Mandal | H04L 45/54 370/400 |
| 9,246,821 B1 | * | 1/2016 | Li | H04L 47/125 |
| 10,021,025 B2 | * | 7/2018 | Beshai | H04L 49/1584 |
| 10,798,000 B2 | * | 10/2020 | Holbrook | H04L 45/748 |
| 2007/0110024 A1 | * | 5/2007 | Meier | H04L 45/46 370/351 |
| 2013/0242745 A1 | * | 9/2013 | Umezuki | H04L 47/17 370/236 |
| 2013/0243006 A1 | * | 9/2013 | Otsuka | H04L 49/357 370/401 |
| 2014/0355615 A1 | * | 12/2014 | Chang | H04L 45/245 370/392 |
| 2016/0028625 A1 | * | 1/2016 | Hari | H04L 45/74 370/392 |

* cited by examiner

*Primary Examiner* — Phuc H Tran

(57) ABSTRACT

A method for automatically establishing an address-port mapping table of a switching device in an interconnect fabric uses hardware link-up and link-down processes to build and update the lowest cost (e.g., shortest path) port entries in the mapping table. Traffic loops are precluded by comparing cost values based on the source addresses of the devices in the interconnect fabric, without blocking any particular port.

14 Claims, 14 Drawing Sheets

AUTOMATICALLY ESTABLISHING AN ADDRESS MAPPING TABLE IN A HETEROGENEOUS DEVICE INTERCONNECT FABRIC

BACKGROUND

With the rapid growth of heterogeneous device pools, such as accelerator pools, memory pools, and storage pools, for example, links between heterogeneous devices are becoming more important and dedicated. Requirements for such pools include short latency, high bandwidth, flexibility, and simplified establishment of paths, but traditional Ethernet networks do not provide a good environment for satisfying these requirements.

The Spanning Tree Protocol (STP) is a network protocol that builds a logical topology for Ethernet networks that is free of traffic loops and the problems caused by traffic loops (e.g., broadcast storms). It requires the steps of selecting a root bridge and bridge identifier (ID), which act as the controller or manager for STP on the network. Then, each switch needs to identify its root port and designated ports, and block some ports to avoid a traffic loop. Each step is time-consuming, and furthermore convergence times are long and disruptive. Also, the protocol is unstable with multicast optimization. The largest of these drawbacks is that the blocked ports lead to inefficient paths, which are perhaps much longer than the shorter paths that would be available if not blocked.

Rapid Spanning Tree Protocol (RSTP) is compatible with STP, but provides significantly faster convergence time by, for example, implementing a shorter maximum age time and eliminating forward delay time. However, it still uses a root bridge as the manager, and the route cost is still based on the cost to the root bridge. Consequently, the path from any point to any other point may not be the shortest. Moreover, RSTP divides the blocked port role per STP into alternate and backup roles. Any port in the alternate role still functions as a blocked port even when there is no failure.

Transparent Interconnection of Lots of Links (TRILL) is a routing protocol network standard that performs layer-2 bridging using IS-IS (Intermediate System-to-Intermediate System) link state routing, using links that otherwise would have been blocked. Dijkstra's algorithm is used to find the shortest path between any two vertices in a graph. Each RBridge (routing bridge) has information about all the other RBridges and the connectivity between them. Thus, the RBridges have enough information to compute pair-wise optimal paths for unicasts. However, this introduces the complexity of building a complete cost diagram for the entire set of Bridges RBridges, not just the neighboring RBridges. The routing needs to be computed on sending, and is more than a straightforward lookup. To mitigate temporary loop issues, RPF (Reverse Path Forwarding) is used for multicast, but TTL (Time To Live) is used for unicast, based on a header with a hop count due to non-congruent trees, which is inefficient. Moreover, depending on the selected RBridge, unicast and multicast/broadcast paths can be completely different, which can cause out-of-sequence packets in some situations. Also, native frames are encapsulated in a transport header, their layer-2 headers are swapped at each hop, and are de-encapsulated before delivery, which is more complicated than other solutions.

Shortest Path Bridge (SPB) is a networking technology intended to simplify the creation and configuration of networks, while enabling multipath routing. It unifies unicast and multicast, and allows all paths to be active with multiple equal-cost paths. It also uses the IS-IS routing protocol to find the shortest path while preventing loops. However, each switch still needs a large database to have all the routing and cost information, and computes a path before finding the egress port. M-in-M (Mac-in-Mac) encapsulation is used.

Open Shortest Path First (OSPF) is a routing protocol for Internet Protocol (IP) networks. OSPF uses a Link State Routing (LSR) algorithm and falls into the group of Interior Gateway Protocols (IGPs), operating within a single Autonomous System (AS). It needs a much larger database to facilitate finding and establishing the shortest path not belonging to the layer-2 protocol.

SUMMARY

It is important to find a solution that can overcome the shortcomings presented above. A customized interconnection that can support hundreds or thousands of heterogeneous devices is needed.

Embodiments according to the present disclosure generally pertain to methods for automatically establishing (populating or building) an address mapping table in each switching device for routing in, for example, a private heterogeneous device interconnect fabric. Disclosed herein are novel address mapping methods for automatically establishing a mapping table in each switching device of an interconnect fabric (e.g., a private interconnect fabric). On detecting link-up or link-down, the disclosed methods: automatically establish the lowest cost (e.g., shortest) path, with backup, from any node (device) to any node (device); avoid traffic loops and their problems (e.g., broadcast storms); support multicasting/broadcasting; and reduce management costs.

In embodiments, a method for automatically establishing an address-port mapping table of a device in an interconnect fabric uses hardware link-up processes to automatically build and update the lowest cost (e.g., shortest path) port entry in the mapping table. Traffic loops are precluded by comparing cost values based on the source addresses of the devices in the device interconnect fabric, without blocking any particular port.

Embodiments according to the present disclosure provide the following advantages and benefits. Embodiments according to the present disclosure can be implemented in hardware, without software for path calculations, on different types of connection topologies. Relatively small mapping tables are established and updated on link-up and link-down events. Each mapping table entry includes cost information for the shortest egress port. By a simple mapping table lookup, the traffic is assigned to the shortest path and the desired egress port. Traffic loops are avoided by comparisons with the lowest cost value on the source address. Congruent and deterministic paths are provided for all traffic, and unicasts and multicasts/broadcasts are unified. All possible routes are used, based on deterministic paths. Encapsulation is not necessary, nor is it necessary to disable a port or path. Convergence time is reduced.

These and other objects and advantages of the various embodiments of the present disclosure will be recognized by those of ordinary skill in the art after reading the following detailed description of the embodiments that are illustrated in the various drawing figures.

DETAILED DESCRIPTION

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

The figures are not necessarily drawn to scale, and only portions of the devices and structures depicted, as well as the various layers that form those structures, are shown. For simplicity of discussion and illustration, only one or two devices or structures may be described, although in actuality more than one or two devices or structures may be present or formed. Also, while certain elements, components, and layers are discussed, embodiments according to the present disclosure are not limited to those elements, components, and layers. For example, there may be other elements, components, layers, and the like in addition to those discussed.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those utilizing physical manipulations of physical quantities. Usually, although not necessarily, these quantities take the form of electrical or magnetic signals capable of being stored, transferred, combined, compared, and otherwise manipulated in a computer system or the like. It has proven convenient at times, principally for reasons of common usage, to refer to these signals as transactions, bits, values, elements, symbols, characters, samples, pixels, or the like.

Figure 1:
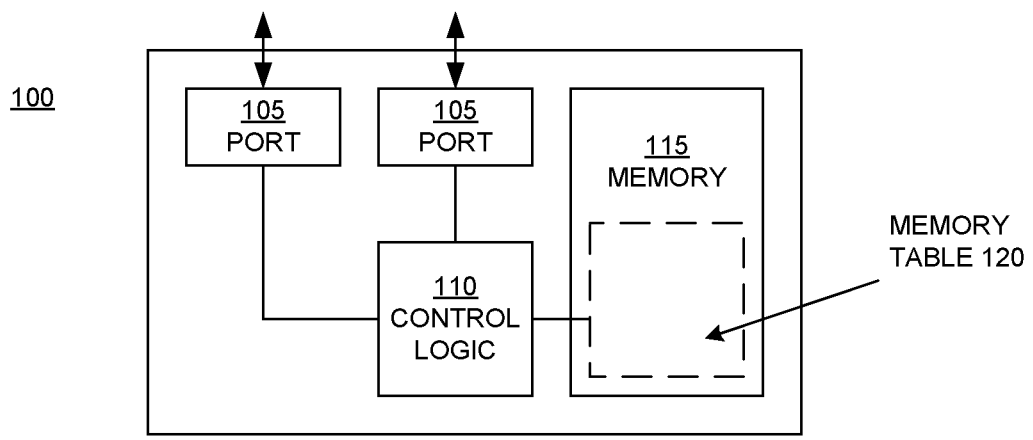
FIG. 1 is a block diagram illustrating an example of a device (e.g., a switch device) on which embodiments according to the present disclosure can be implemented.

FIG. 1 is a block diagram illustrating an example of a computer system or device (e.g., a switch device) 100 on which embodiments according to the invention can be implemented. As shown in the example of FIG. 1, the device 100 includes ports 105, control logic 110, and memory 115. The example device 100 is simplified to highlight aspects of the embodiments described herein and, in practice, the device may be configured with a variety of additional functions, features, and components.

A mapping table 120 (e.g., an address-port mapping table) is stored in (resides in) the memory 115 of FIG. 1. The control logic 110 is generally configured to perform operations including operations that generate, evaluate, update, send, and receive messages exchanged with and between the other devices 101 and 106 over the ports 105 and establish (e.g., build) the mapping table 120, as will be described further below using the examples of FIGS. 3-14. The control logic 110 may be, but is not limited to, an Application-Specific Integrated Circuit (ASIC) or a Field-Programmable Gate Array (FPGA).

Figure 2A:
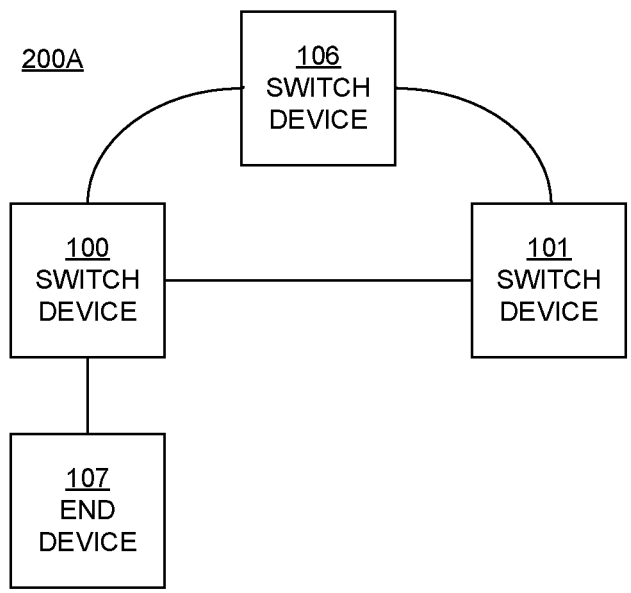
FIGS. 2A and 2B are block diagrams of examples of a portion of interconnect fabrics, in which embodiments according to the present disclosure can be implemented.
Figure 2B:
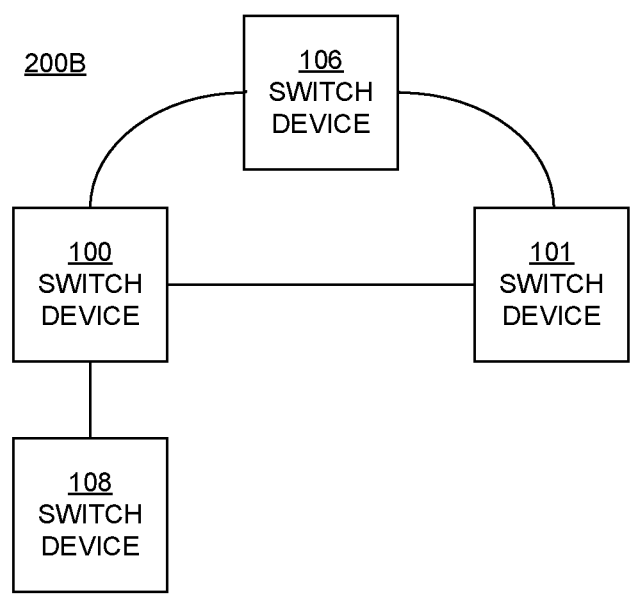

FIGS. 2A and 2B are block diagrams of examples of a portion of interconnect fabrics (e.g., private heterogeneous device interconnect fabrics) 200A and 200B, respectively, in which embodiments according to the present disclosure can be implemented. While only four devices are shown, the interconnect fabrics 200A and 200B can include any practical number of such devices. The interconnect fabrics 200A and 200B may otherwise be referred to as networks on interconnect fabric. "Heterogeneous devices," as used herein, refers to devices that, in general, are not the same type of device. That is, for example, heterogeneous devices can have different capabilities, functionalities, hardware, software, etc., without limitation, but have the capability to connect with and communicate with other heterogenous devices.

In the example of FIG. 2A, the device 100 is coupled to other switch devices 101 and 106 and to an end device 107 in the interconnect fabric 200A. The switch devices 101 and 106 have configurations like that shown in FIG. 1. The end device 107 may also be configured like that shown in FIG. 1, except that it does not have a mapping table. Each device (switch device or end device) has its own unique address.

In the example of FIG. 2B, the device 100 is coupled to other switch devices 101 and 106 like in the example of FIG. 2A, and is also coupled to another switch device 108 in the interconnect fabric 200B. The switch device 108 can have a configuration like that shown in FIG. 1.

The devices 101, 106, 107, and 108 may be heterogeneous devices, although the invention is not so limited. That is, one or more of these devices may be different from the other devices in some way as described above, or one or more of these devices may be the same type of device as another device.

The nomenclature and abbreviations listed below are used in the following description of example address mapping processes according to the present disclosure:

H_: HELLO message;
A_: ACK message;
U_: UPDATE message;
_J: path cost J (e.g., J=1, 2, . . . );
SK: source address K;
DL: destination address L;
Dx: broadcast address;
H_SKDx_J: HELLO message from source address K to any destination with path cost J;
A_SKDL_J: ACK message from source address K to destination address L with path cost J;
U_SKDL_J: UPDATE message from source address K to destination address L with cost J.

In overview, in embodiments, a network or system includes an interconnect fabric of devices (e.g., a heterogeneous device interconnect fabric), where each device has a number of ports and a source address that is unique within the network. Each device has a memory where a mapping table is stored. Each mapping table entry in the mapping table of each device is indexed by a source address of another device in the network (interconnect fabric). Each mapping table entry in the mapping table of each device includes port entries for at least one path that is shortest between the device and a device in the network that has a source address that indexes the mapping table entry in the mapping table. The shortest paths are determined based on a cost value per path. A port entry of a mapping table entry in the mapping table of a device is updated in response to receiving a message that includes both the source address that indexes the mapping table entry and a cost value that is less than a cost value for the port entry.

Figure 3:
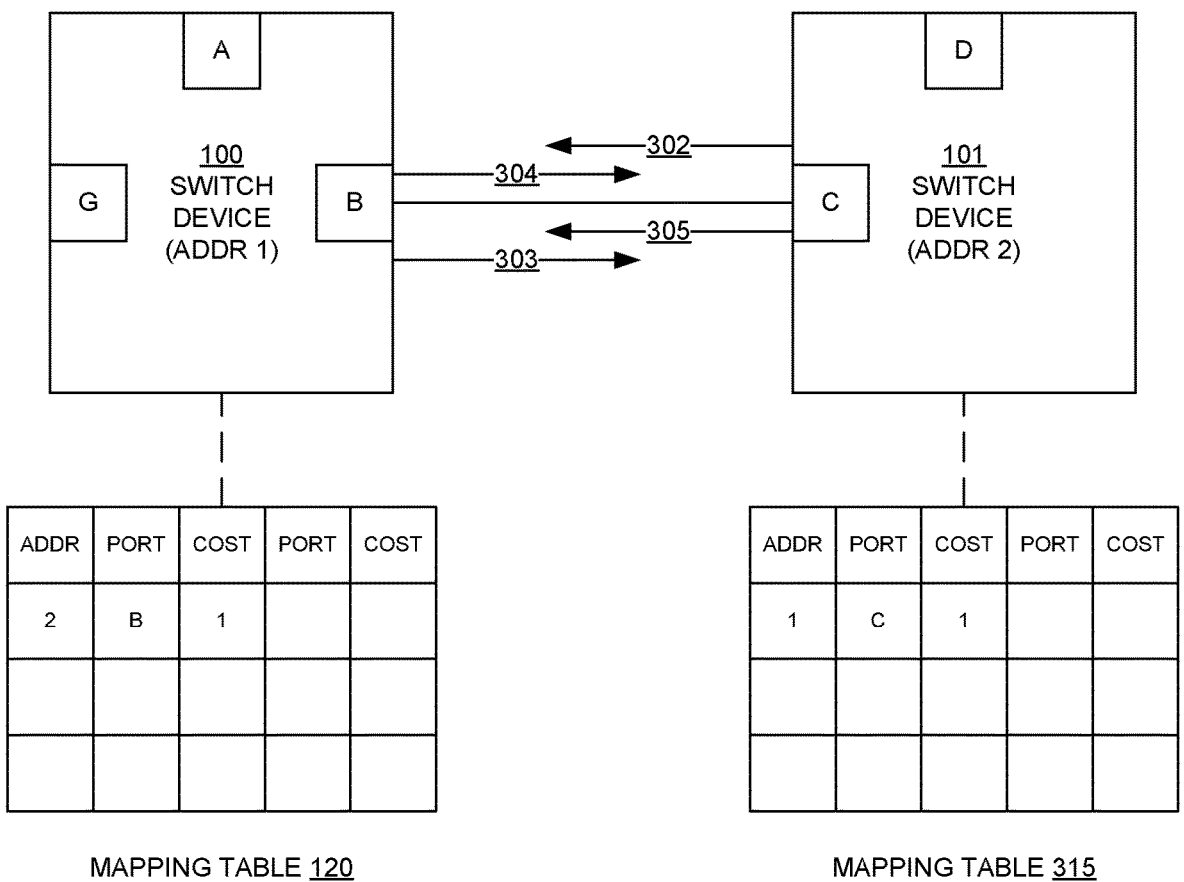
FIG. 3 is an example in which the two switch devices in an interconnect fabric are initially connected to each other with one link, in embodiments according to the present disclosure.

FIG. 3 is an example in which the two switch devices 100 and 101 in an interconnect fabric (e.g., a private heterogeneous device interconnect fabric) 300 are initially connected to each other with one link, in embodiments according to the present disclosure. Both of the switch devices 100 and 101 start with an empty mapping table. In this example, the switch device 100 has address (ADDR) 1 and ports A, B, and G, the switch device 101 has address 2 and ports C and D, and ports B and C are connected. In an embodiment, the ports B and C are connected by cable.

An address-port lookup table 120 is resident on the switch device 100, and an address-port lookup table 315 is resident on the switch device 101. Each mapping table entry in the lookup table 120 or 315 (and in the lookup tables in the other examples described below) includes an address entry and one or more port entries. Each port entry includes a port identifier and a cost value. Thus, one or more port entries are associated with each address entry in a lookup table.

In the examples below, an address is represented using an integer value, a port identifier is represented using a single letter, and a cost value is represented using an integer value. Also, the examples include multiple port entries per mapping table entry. However, the invention is not so limited. An address may be other than an integer value, a port identifier may be other than a single letter, and a cost value may be other than an integer value. Also, there may be only one port entry per mapping table entry, in which case that port entry will include the lowest cost value.

After detecting the link-up with the device 100 on port B, the device 101 sends a HELLO message 302 with source address 1, broadcast destination address x, and a cost value equal to one (referred to herein as "cost 1"). The format of the HELLO message 302 is H_S2Dx_1 (refer to the nomenclature above, here and in the following discussion).

After detecting the link-up with the device 101, the device 100 sends out a HELLO message 303 with source address 1, broadcast destination address x, and cost 1. The format of the HELLO message 303 is H_S1Dx_1.

In this example, the device 100 receives the HELLO message 302 at port B. The device 100 records a new entry (a new mapping table entry) in its address-port mapping table 120, as address 2 (an address entry), port B, and cost 1 (a port entry associated with that address entry). Also, the device 100 sends an ACK message 304 to the device 101. The format of the ACK message 304 is A_S1D2_1, meaning an ACK message from source address 1 to destination address 2 with cost 1.

Similarly, the device 101 receives the HELLO message 303 at port C. The device 101 records a new entry in its address-port mapping table 315, as address 1, port C, and cost 1. Also, the device 101 sends an ACK message 305 to the device 100. The format of the ACK message 305 is A_S2D1_1, meaning an ACK message from source address 2 to destination address 1 with cost 1.

Figure 4:
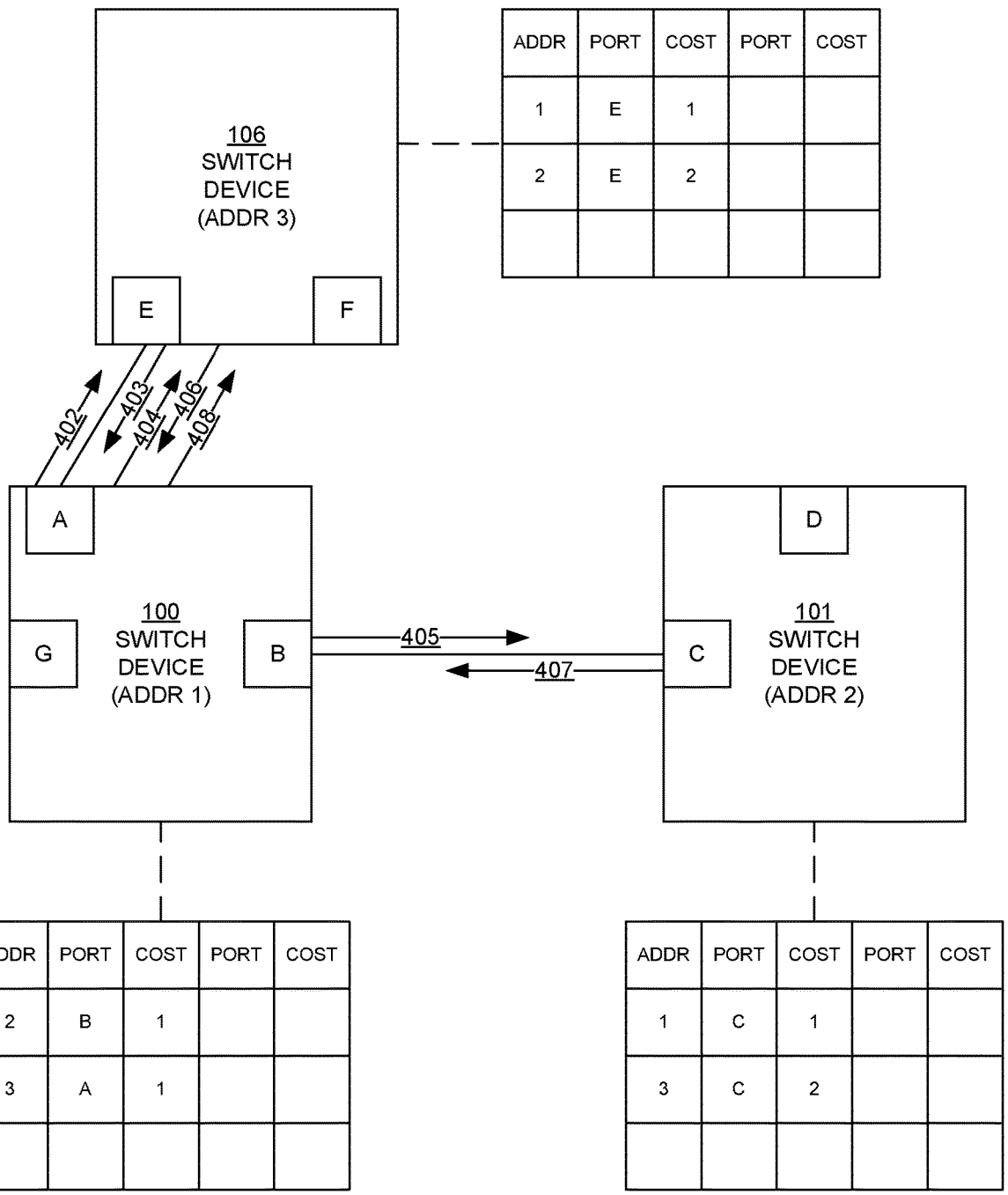
FIG. 4 is an example in which another switch device is then added to the interconnect fabric, in embodiments according to the present disclosure.

FIG. 4 is an example in which another switch device 106 is then added to the interconnect fabric 300, in embodiments according to the present disclosure. In an embodiment, the devices 100 and 106 are connected by cable. FIG. 4 continues the example of FIG. 3. In the example, the device 106 has address 3 and ports E and F, and port E is connected with port A of the device 100.

After detecting the link-up on port A, the device 100 sends a HELLO message 402 from port A to the device 106. The format of the HELLO message 402 is H_S1Dx_1, meaning a HELLO message from source address 1 to broadcast destination address x with cost 1.

The device 106 detects the link-up on port E, and then sends out a HELLO message 403 with source address 3, broadcast destination address x, and cost 1, formatted as H_S3Dx_1.

The device 100 receives the HELLO message 403 on port A. The device 100 records a new entry in its mapping table 120, as address 3, port A, and cost 1. The device 100 sends out an ACK message 404 with format A_S1D3_1 from the receiving port A to destination address 3 (the device 106). Additionally, the device 100 forwards the HELLO message 403 to all of its active ports (e.g., port B) except the receiving port (e.g., port A), but increases the cost by one, to cost 2, in the forwarded HELLO message 405. Thus, the format of the HELLO message 405 at port B is H_S3Dx_2. The device 100 sends the HELLO message 405 to the device 101.

The device 106 receives the HELLO message 402 on port E. The device 106 records a new entry in its address-port mapping table 416, as address 1, port E, and cost 1, and then then sends an ACK message 406 with format A_S3D1_1.

The device 101 receives the HELLO message 405 on port C. The device 101 records a new entry in its mapping table 315, as address 3 at port C with cost 2, and then sends an ACK message 407 to the device 100 with format A_S2D3_1.

The device 100 receives the ACK message 407 on port B, and determines that the message is from source address 2 to destination address 3. The device 100 determines that destination address 3 is already in its mapping table 120 on port A. Consequently, the device 100 forwards the ACK message 407 to port A, and increases the cost by one, to cost 2, in the forwarded ACK message 408. Thus, the format of the forwarded ACK message 408 at port A is A_S2D3_2. The device 100 sends the ACK message 408 to the device 106.

The device 106 receives the ACK message 408 from the device 100 on port E. Accordingly, the device 106 records a new entry in its mapping table 416, as address 2, port E, and cost 2.

Therefore, at this point in the example, each of the mapping tables 120, 315, and 416 has address mappings and cost information for connections between the switch devices 100, 101, and 106 in the interconnect fabric 300.

Figure 5:
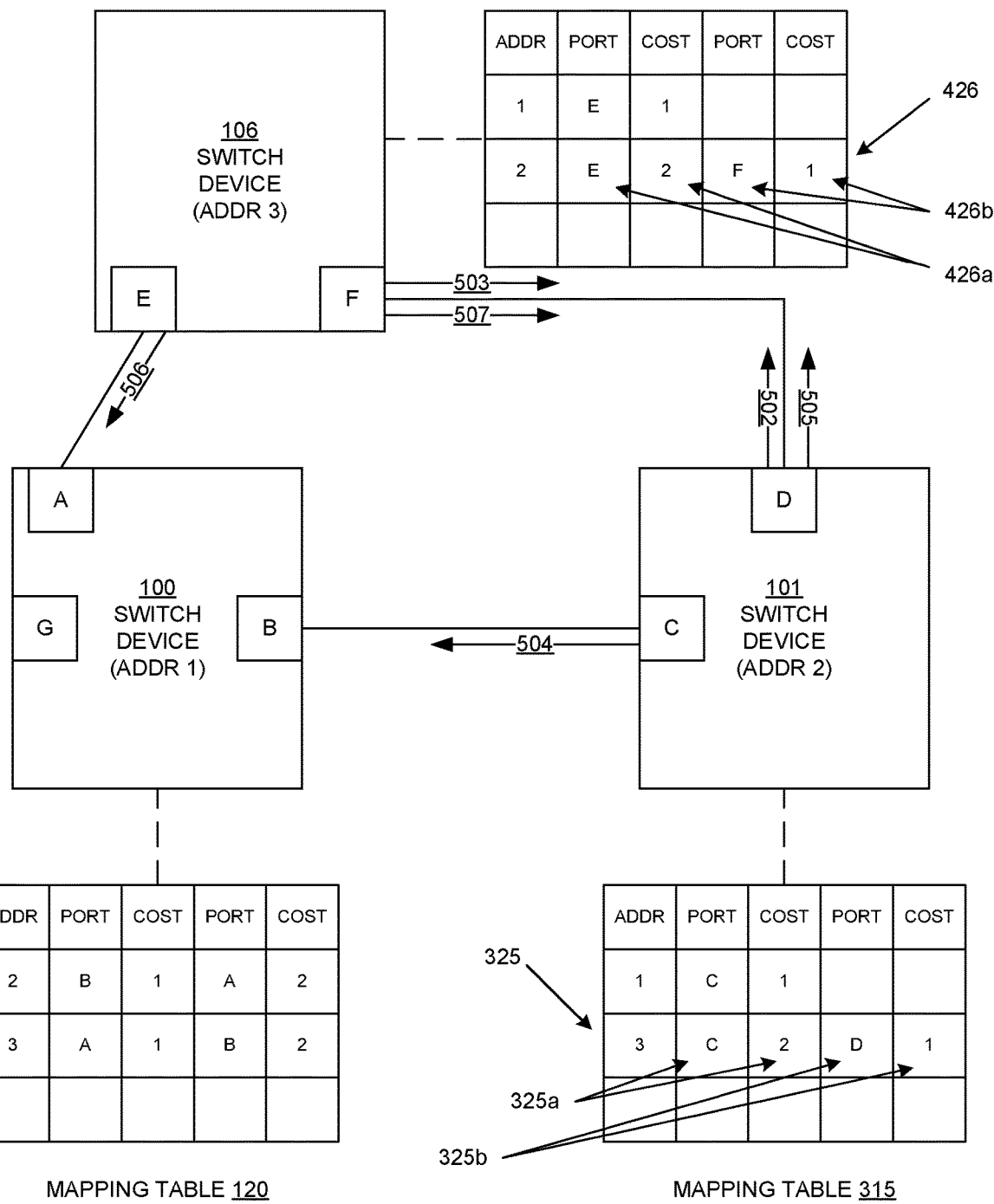
FIG. 5 is an example in which a new connection between the devices is then added to the interconnect fabric, in embodiments according to the present disclosure.

FIG. 5 is an example in which a new connection between the devices 101 and 106 is then added to the interconnect fabric 300, in embodiments according to the present disclosure. In an embodiment, the devices 101 and 106 are connected by cable. FIG. 5 continues the example of FIGS. 3 and 4. In the example, port D of the device 101 and port F of the device 106 are connected.

As can be seen in the example, the three switch devices 100, 101, and 106 are connected in way that superficially suggests a loop. However, embodiments according to the present disclosure avoid traffic loops and problems with traffic loops (e.g., broadcast storms), by exchanging HELLO messages as described above to establish a shortest path entry in the mapping table of each of the switching devices. Also, as will be described below, forwarding of such HELLO messages are halted by comparing costs on the source address: if the receiving cost for a source address is not the lowest, then forwarding of HELLO messages is stopped.

With reference to the example of FIG. 5, after detecting the link-up on port D, the device 101 sends a HELLO message 502 from port D to the device 106. The HELLO message 502 has format H_S2Dx_1, meaning a HELLO message from source address 2 to broadcast address x with cost 1.

The device 106 detects the link-up on port F, and sends out a HELLO message 503 with source address 3, broadcast destination address x, and cost 1, formatted as H_S3Dx_1.

The device 101 receives the HELLO message 503 on port D. In response, the device 101 checks its mapping table 315 and finds the address-port entry 325 for address 3 (the address of the device 106) with cost 2 on port C. Because the new HELLO message 503 has a lower cost, the device 101 adds port D and cost 1 to the entry 325. Thus, the entry 325 in the mapping table 315 now includes two port entries 325a and 325b for address 3. Also, because the newer cost in the port entry 325b is lower than the prior cost in the port entry 325a, the device 101 forwards the HELLO message 503 to all of its active ports (e.g., port C) except the receiving port (e.g., port D), but increases the cost by one, to cost 2, in the forwarded HELLO message 504. Thus, the format of the HELLO message 504 at port C is H_S3Dx_2. The device 101 sends the HELLO message 504 to the device 100. In addition, the device 101 sends an ACK message 505 to the device 106, formatted as A_S2D3_1.

In some implementations, there is only a single port entry per mapping table entry. In such implementations, instead of adding the port entry 325b as described above, the information in the port entry 325a is updated or replaced so that it includes port D and cost 1 instead of port C and cost 2.

A similar set of operations occurs on the device 106. The device 106 receives the HELLO message 502 on port F. In response, the device 106 checks its mapping table 416 and finds the address-port entry 426 for address 2 (the address of the device 101) with cost 2 at port E. Because the HELLO message 502 has a lower cost, the device 106 adds port F and cost 1 to the entry 426. Thus, the entry 426 in the mapping table 416 now includes two port entries 426a and 426b for address 2. Note that, instead of including two port entries for address 2 in the mapping table 416, the current port entry 426a can be updated or replaced as described above. Also, because the newer cost in the port entry 426b is lower than the prior cost in the port entry 426a, the device 106 forwards the HELLO message 502 to all of its active ports (e.g., port E) except the receiving port (e.g., port F), but increases the cost by one, to cost 2, in the forwarded HELLO message 506. Thus, the format of the HELLO message 506 at port E is H_S2Dx_2. The device 106 sends the HELLO message 506 to the device 100. In addition, the device 106 sends an ACK message 507 to the device 106, formatted as A_S3D2_1.

The device 100 receives the forwarded HELLO messages 504 and 506 on ports B and A, respectively. Both of the HELLO message 504 and 506 have higher costs than the existing costs in the mapping table 120. However, because the mapping table 120 at this point includes only one port entry per mapping table (address-port) entry (see the version of the mapping table in FIG. 4), the device 100 associates a second port entry with each address entry, as shown in FIG. 5. Because the costs added to the mapping table 120 are higher than existing costs in that table, no more ACK messages and no more HELLO messages are sent. In this manner, a traffic loop is avoided. Alternatively, in implementations in which there is only one port entry per mapping table entry, the second port entries are not added to the mapping table and no more ACK messages and no more HELLO messages are sent because, in this example, each of the current port entries has a lower cost value.

At this point in the example, all of the switch devices 100, 101, and 106 in the interconnect fabric 300 have a lowest cost entry in their respective mapping tables for the addresses corresponding to the other devices in the interconnect fabric 300. The lowest cost port corresponds to the shortest path when switching. If a mapping table includes information for a second port for a given address, then that port is available as a backup. Multicast/broadcast also follows the shortest path when forwarding. Accordingly, there is no need to disable a connection as in conventional protocols such as the Spanning Tree Protocol (STP).

Figure 6:
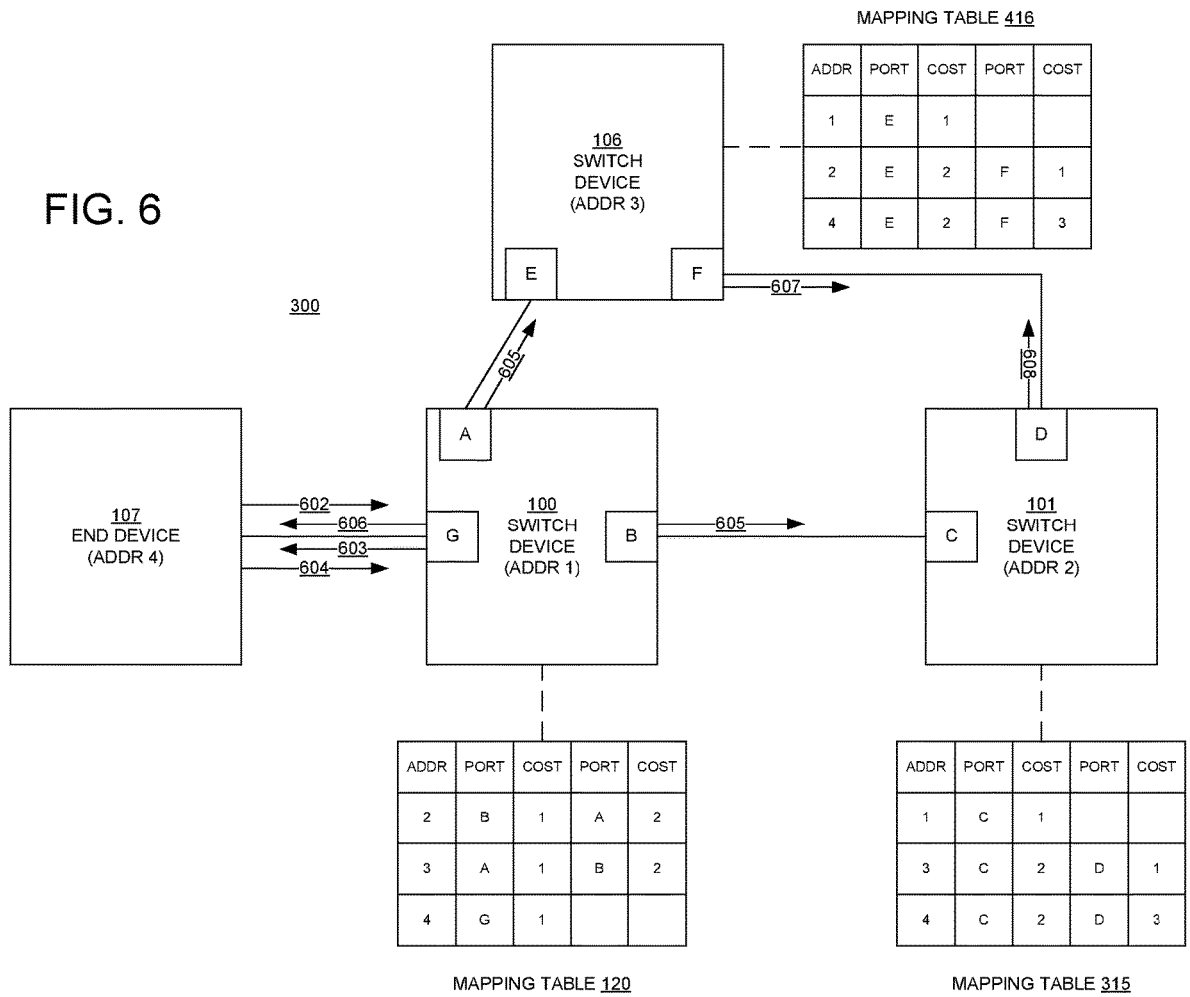
FIG. 6 is an example in which an end device is then added to the interconnect fabric, in embodiments according to the present disclosure.

FIG. 6 is an example in which an end device 107 is then added to the interconnect fabric 300, in embodiments according to the present disclosure. In an embodiment, the devices 100 and 107 are connected by cable. FIG. 6 continues the example of FIGS. 3-5. In the example, the device 107 has address 4 and is connected with port G of the device 100. In the example of FIG. 6, the mapping tables may include multiple port entries per address. However, as in the examples above, a mapping table may include only a single port entry per address, in which case the following discussion can be readily extended to that type of implementation in view of the discussion above.

In embodiments according to the present disclosure, end devices (e.g., the end device 107) do not have a mapping table.

After detecting the link-up with the switch device 100, the end device 107 sends a HELLO message 602, formatted as H_S4Dx_1, to the switch device. The switch device 100 detects the link-up on port G, and sends a HELLO message 603, formatted as H_S1Dx_1, to the end device 107. The end device 107 sends an ACK message 604, formatted as A_S4D1_1, to the switch device 100.

In response to the HELLO message 602, the switch device 100 adds a new entry to its mapping table 120 as address 4, port G, and cost 1. The switch device 100 also forwards the HELLO message 602 to its active ports A and B, but increases the cost by one, to cost 2, in the forwarded HELLO message 605. Thus, the format of the HELLO message 605 at ports A and B is H_S4Dx_2. Also, the switch device 100 sends an ACK message 606, with format A_S1D4_1, to the end device 107.

The switch device 106 receives the HELLO message 605 on port E. Because the source address is new, the switch device 106 adds an entry to its mapping table 416, as address 4, port E, and cost 2. The switch device 106 also forwards the HELLO message 605 to port F, but increases the cost by one, to cost 2, in the forwarded HELLO message 607. Thus, the format of the HELLO message 607 at port F is H_S4Dx_3.

Similarly, the switch device 101 receives the HELLO message 605 on port C. Because the source address is new, the switch device 101 adds an entry to its mapping table 315, as address 4, port C, and cost 2. The switch device 106 also forwards the HELLO message 605 to port D, but increases the cost by one, to cost 2, in the forwarded HELLO message 608. Thus, the format of the HELLO message 608 at port D is H_S4Dx_3.

The switch device 106 receives the HELLO message 608 at port F. However, the mapping table 416 of the switch device 106 already has an entry for address 4 and that entry has a lower cost value than that of the HELLO message 608, and so the switch device 106 associates a second port entry (port D and cost 3) with that address entry in its mapping table. Also, the switch device 106 does not forward the HELLO message 608.

In a similar manner, in response to the HELLO message 605, the switch device 101 associates port D with cost 3 as a second port entry with address 4 in its mapping table 315.

Thus, at this point, all of the switch devices 100, 101, and 106 in the interconnect fabric 300 have path information for the end device 107, which identifies the shortest paths to the end device.

Figure 7:
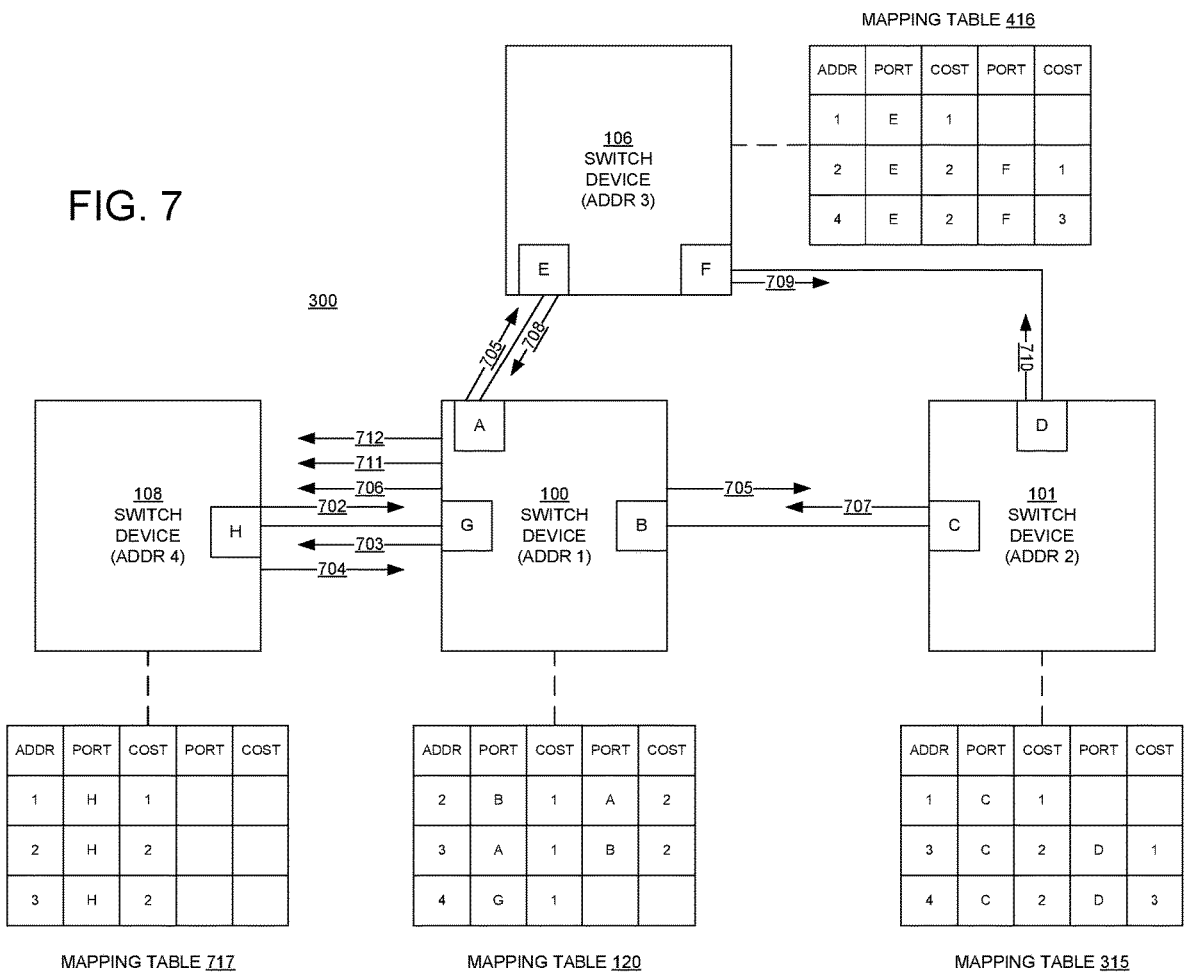
FIG. 7 is an example in which a switch device is added to the interconnect fabric 300, in embodiments according to the present disclosure.

FIG. 7 is an example in which a switch device 108 is added to the interconnect fabric 300, in embodiments according to the present disclosure. In an embodiment, the devices 100 and 108 are connected by cable. FIG. 7 continues the example of FIGS. 3-5. In the example, the device 108 has address 4 and port H, and is connected with port G of the device 100. In the example of FIG. 7, the mapping tables may include multiple port entries per address. However, as in the examples above, a mapping table may include only a single port entry per address, in which case the following discussion can be readily extended to that type of implementation in view of the discussion above.

The example of FIG. 7 differs from the example of FIG. 6, in that the added device is a switch device instead of an end device. Accordingly, forwarded HELLO messages are acknowledged if they result in a new mapping table entry or if their cost value is lower than the cost in an existing mapping table entry, so that the switch device 108 can establish (build or populate) its mapping table 717.

After detecting the link-up with the switch device 100, the switch device 108 sends a HELLO message 702, formatted as H_S4Dx_1, to the switch device 100. The device 100 detects the link-up on port G, and sends a HELLO message 703, formatted as H_S1Dx_1, to the device 108. The device 108 sends an ACK message 704, formatted as A_S4D1_1, to the switch device 100.

In response to the HELLO message 702, the device 100 adds a new entry to its mapping table 120 as address 4, port G, and cost 1. The device 100 also forwards the HELLO message 702 to its active ports A and B, but increases the cost by one, to cost 2, in the forwarded HELLO message 705. Thus, the format of the HELLO message 705 at ports A and B is H_S4Dx_2. Also, the switch device 100 sends an ACK message 706, with format A_S1D4_1, to the device 108.

In the example of FIG. 7, the devices 101 and 106 behave as in the example of FIG. 6. In addition to what is described in the example of FIG. 4, the devices 101 and 106 send ACK messages 707 and 708, respectively, formatted as A_S2D4_1 and A_S3D4_1, respectively, to the device 100.

The device 106 receives the HELLO message 705 on port E. Because the source address is new, the device 106 adds an entry to its mapping table 416, as address 4, port E, and cost 2. The device 106 also forwards the HELLO message 705 to port F, but increases the cost by one, to cost 2, in the forwarded HELLO message 709. Thus, the format of the HELLO message 709 at port F is H_S4Dx_3.

Similarly, the device 101 receives the HELLO message 705 on port C. Because the source address is new, the device 101 adds an entry to its mapping table 315, as address 4, port C, and cost 2. The device 106 also forwards the HELLO message 705 to port D, but increases the cost by one, to cost 3, in the forwarded HELLO message 710. Thus, the format of the HELLO message 710 at port D is H_S4Dx_3.

The device 106 receives the HELLO message 710 at port F. However, the mapping table 416 of the device 106 already has an entry for address 4 and that entry has a lower cost value than that of the HELLO message 710, and so the device associates a second port entry (port D and cost 3) with that address in its mapping table. Also, the device 106 does not forward the HELLO message 710.

In a similar manner, in response to the HELLO message 705, the device 101 associates port D with cost 3 as a second port entry for address 4 in its mapping table 315.

The device 100 forwards the ACK messages 707 and 708 to the device 108 after incrementing the cost value in these messages. The forwarded ACK messages 711 and 712 thus have formats A_S3D4_2 and A_S2D4_2, respectively.

The device 108 receives the ACK messages 711 and 712, and adds entries to its mapping table 717 in response. Specifically, the mapping table 717 is updated to include an entry as address 2, port H, and cost 2 and an entry as address 3, port H, and cost 2.

Thus, at this point, each switch device 100, 101, 106, and 108 in the interconnect fabric 300 has path information for each of the other switch devices in its respective mapping table, which identifies the shortest paths between the switch devices.

Figure 8:
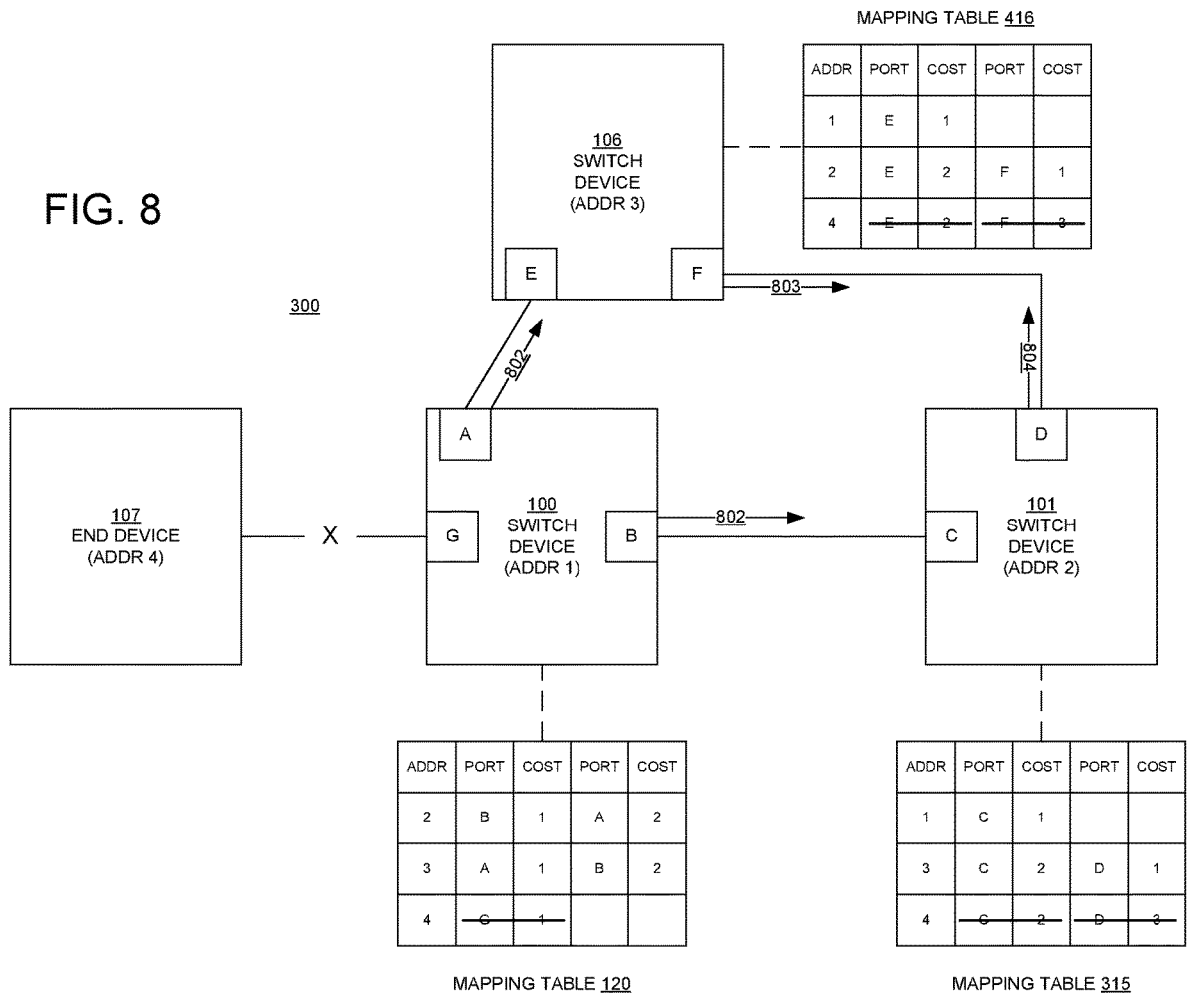
FIG. 8 illustrates an example in which a link-down state is detected between an end device and a switch device in the interconnect fabric, in embodiments according to the present disclosure.

FIG. 8 illustrates an example in which a link-down state or event is detected between the end device 107 and the switch device 100 in the interconnect fabric 300, in embodiments according to the present disclosure. The example of FIG. 8 is based on the example of FIG. 6. In the example of FIG. 8, the mapping tables may include multiple port entries per address. However, as in the examples above, a mapping table may include only a single port entry per address, in which case the following discussion can be readily extended to that type of implementation in view of the discussion above.

In the example of FIG. 8, in response to detecting the link-down, the switch device 100 checks its mapping table 120 and finds address 4, corresponding to the end device 107. The switch device 100 then sends an UPDATE message 802 to the switch devices 101 and 106 on its active ports A and B. The format of the UPDATE message 802 is U_S1D4_1.

The switch device 106 receives the UPDATE message 802 on port E, removes the port entry for address 4 for port E from its mapping table 416, and forwards the UPDATE message 802 to port F, but increases the cost by one, to cost 2, in the forwarded UPDATE message 803. Thus, the format of the UPDATE message 803 at port F is U_S1D4_2. The UPDATE message 803 is sent to the switch device 101.

Similarly, the switch device 101 receives the UPDATE message 802 on port C, removes the port entry for address 4 for port C from its mapping table 315, and forwards the UPDATE message 802 to port D, but increases the cost by one, to cost 2, in the forwarded UPDATE message 804. Thus, the format of the UPDATE message 804 at port F is U_S1D4_2. The UPDATE message 804 is sent to the switch device 106.

The switch device 106 receives the UPDATE message 804 on port F, and removes the port entry for address 4 for port F from its mapping table 416. As a result, the mapping table 416 does not include an entry for address 4, and the UPDATE message 804 is not forwarded.

In a similar manner, the switch device 101 receives the UPDATE message 803 on port D, and removes the port entry for address 4 for port D from its mapping table 315. As a result, the mapping table 315 does not include an entry for address 4, and the UPDATE message 803 is not forwarded.

Figure 9:
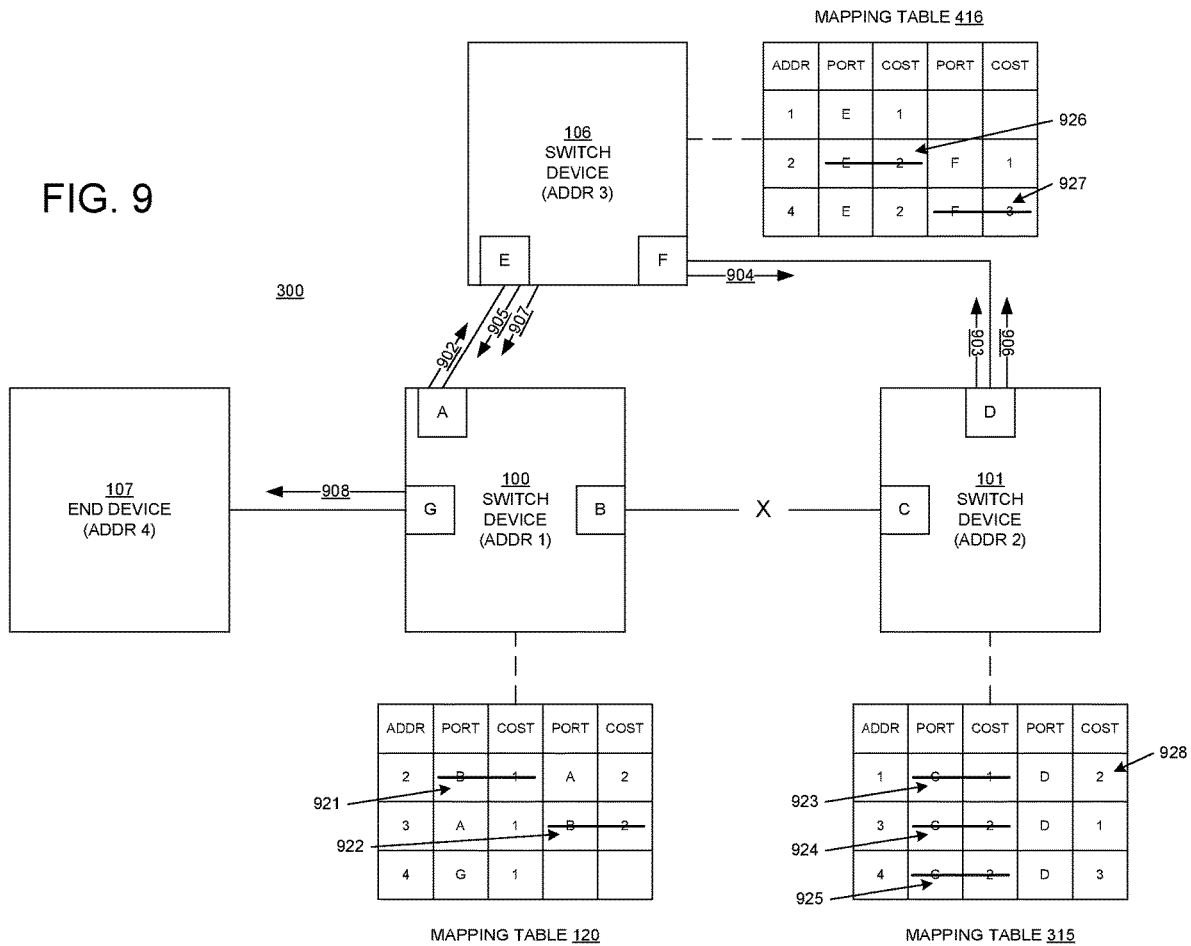
FIG. 9 illustrates an example in which a link-down state is detected between switch devices in the interconnect fabric, in embodiments according to the present disclosure.

FIG. 9 illustrates an example in which a link-down state or event is detected between the switch device 100 and the switch device 101 in the interconnect fabric 300, in embodiments according to the present disclosure. The example of FIG. 9 is based on the example of FIG. 6.

In the example of FIG. 9, in response to detecting the link-down on port B, the switch device 100 determines that the port entry 921 for address 2 in its mapping table 120 has the lowest cost value for that address. Accordingly, because the lowest cost port is down, the switch device 100 sends an UPDATE message 902 to address 2, formatted as U_S1D2_1. Port entry 921 is removed from the mapping table 120 because port B is a down port.

Also, the switch device 100 can search its mapping table 120 and find the second port entry 922 associated with port B and address 3. Because the cost value for the entry 922 is not the lowest, the switch device 100 can remove that entry from the mapping table 120 but an UPDATE message is not needed.

In a similar manner, in response to detecting the link-down on port C, the switch device 101 determines that the port entry 923 for address 1 in its mapping table 315 has the lowest cost value for that address. Accordingly, because the lowest cost port is down, the switch device 101 sends an UPDATE message 903 to address 1, formatted as U_S2D1_1.

Also, the switch device 101 can search its mapping table 315 and find the port entry 924 associated with port C and address 3. Because the cost value for the port entry 924 is not the lowest, the switch device 101 can remove that entry from the mapping table 315 but an UPDATE message is not needed.

The switch device 106 receives the UPDATE message 902 targeted to address 2 on port E. The switch device 106 removes the entry 926 from its mapping table 416, and forwards the UPDATE message 902 to port F after incrementing the cost value by one, to cost 2, in the forwarded UPDATE message 904. Thus, the UPDATE message 904 has format U_S1D2_2, and is sent from the switch device 106 to the switch device 101.

The switch device 106 also receives the UPDATE message 903 targeted to address 1 on port F. However, the mapping table 416 does not have a port entry for address 1 for port F. Accordingly, the switch device 106 only forwards the UPDATE message 903 to port E after incrementing the cost value by one, to cost 2, in the forwarded UPDATE message 905. Thus, the UPDATE message 905 has format U_S2D1_2, and is sent from the switch device 106 to the switch device 100.

The switch device 100 receives the UPDATE message 905 on port A. The cost value in that message is the same as that on port A for address 2. In this instance, the mapping table 120 is not changed.

The switch device 101 receives the UPDATE message 904 on port D. The destination address in that message is the address for the switch device 101, and the mapping table 315 does not include an entry for port D for address 1. Thus, the mapping table 315 is updated to include an entry 928, as address 1, port D, and cost 2.

The switch device 101 can search its mapping table 315 and find that the cost value for port C for address 4 is the lowest. In that case, the switch device 101 sends an UPDATE message 906 from port D to the switch device 106. The UPDATE message 906 has format U_S2D4_1.

The switch device 106 receives the UPDATE message 906 on port F. In the mapping table 416, there is a port entry 927 for port F for address 4. Consequently, the switch device 106 removes that entry and forwards the UPDATE message 906 to port E, after incrementing the cost by one, to cost 2, in the forwarded UPDATE message 907. The switch device 106 then sends the UPDATE message 907, with format U_S2D4_2, to the switch device 100.

The switch device 100 forwards the UPDATE message 907 to port G, after incrementing the cost by one, to cost 3, in the forwarded UPDATE message 908. The switch device 100 then sends the UPDATE message 908, with format U_S2D4_3, to the end device 107.

At this point, all switch devices 100, 101, and 106 have updated mapping tables including updated port cost information. Mapping entries related to connections between ports B and C has been removed from their mapping tables.

In the discussion of the examples of FIGS. 3-9, operations and messages are described as occurring in a certain order. However, while there are some operations or messages that are triggered by prior operations or messages and/or trigger subsequent operations or messages, there are other operations or messages that can be performed or sent concurrently.

In the examples of FIGS. 3-9, the mapping tables include two port entries per address or table entry. However, the invention is not so limited. In other implementations, there can be only a single port entry per address or table entry, or there can be more than two port entries per address or table entry.

In the examples of FIGS. 3-9, events other than a link-up or link-down may trigger establishing or updating mapping table entries. However, the invention is not so limited. In other implementations, other events such as, but not limited to, command to link-up or command to link-down can trigger establishing or updating mapping table entries.

To summarize to this point, in embodiments according to the present disclosure, each of the devices in an interconnect fabric (e.g., a private heterogeneous device interconnect fabric as described above), including switch devices (e.g., the devices 101, 106, and 108) and end devices (e.g., the device 107), has its own unique address, which may be assigned to or programmed into the device. In embodiments, only the switch devices establish an address-port mapping table (e.g., the mapping tables 120, 315, 416, and 717) with cost information; end devices do not. The mapping tables are established based on source addresses.

If all paths have equal weights, then the cost information can be treated as the hop number (the default is one). The above examples are based on all paths having equal weight. However, the invention is not so limited. For example, if paths have different weights (e.g., because of a factor such as different transmission speeds or bandwidths), then a predefined relationship between that factor and cost can be used.

In some embodiments, each mapping table entry records at least the two lowest cost ports (port entries) corresponding to the two shortest paths. The lowest cost port is the default port for switching the packet for unicast, multicast, and broadcast. The higher of the two lowest cost ports is the second (next) lowest cost port, and used as the backup in case the status of the lower cost port changes to a link-down state. If both costs are zero, then it means this mapping entry is empty. There can be more than two port entries per mapping table entry, depending on the topology of the interconnect fabric and the number of devices in the interconnect fabric, for example. Also, as previously noted herein, there may be only a single port entry per mapping table entry, in which case that port entry is or will be treated as the lowest cost port.

A port entry in the mapping table can be updated, or a new port can be added, if a lower cost port is subsequently found. Thus, the mapping table entry will have a port entry for at least the shortest path.

In operation, as seen from the above examples, when a device links-up, the device will send a HELLO message to a port with the lowest cost HELLO messages use a broadcast address as the destination address.

An ACK message is sent in response to receiving a HELLO message. An ACK message uses the original source address as the destination address. In embodiments, origin messages have cost 1.

If a device receives an ACK message and the destination address is for the device, then after a fixed delay time, the receiving port can be used to send regular traffic. If the receiving port has already been enabled for regular traffic, then the device ignores the ACK message.

When a switch receives an ACK message and the destination address is a broadcast address, then the device forwards the message to all other ports except the incoming port, and the cost is increased to reflect the real total cost on the path.

When a switch device receives an ACK message and the destination address is not for the device, then the device forwards the message to the port based on a lookup in an address-port mapping table lookup, and the cost is increased to reflect the real total cost on the path.

If a switch device receives a HELLO message and the original HELLO message is from another switch device, and the new cost in the HELLO message is lower than both of the two lowest existing costs in the switch device's mapping table or lower than the one existing cost if only one cost is included in the mapping table entries, then the switch device will send back an ACK message with: its address as the source address, the received source address as the destination address, and cost 1.

If a switch device receives a HELLO message and the original HELLO message is from an end device, then only the switch device directly connected to the end device will send back an ACK message. The HELLO message carries information identifying whether the original device is a switch device or an end device.

When an end device receives a HELLO message, it will send back an ACK message with: its address as the source address, the received source address as the destination address, and cost 1.

After detecting a port in a link-down state on a device, if the cost of the down port on the corresponding entry in the device's lookup table is the lowest value, then an UPDATE message will be sent with cost 1 and with the destination address of the down port to all link-up ports. Following completion of a link-down process, the invalid path will be removed on each switch's mapping table and the mapping table will be updated with the new lower cost.

FIGS. 10, 11, 12, 13, and 14 are flowcharts 1000, 1100, and 1400 of examples of operations that can be automatically performed by a device (e.g., a switch device such as the devices 100, 101, 106, or 108, or an end device such as the end device 107) in a private heterogeneous device (e.g., the interconnect fabric 300), in embodiments according to present disclosure. The operations described below correspond to the operations and events described in the examples of FIGS. 3-9.

Figure 10:
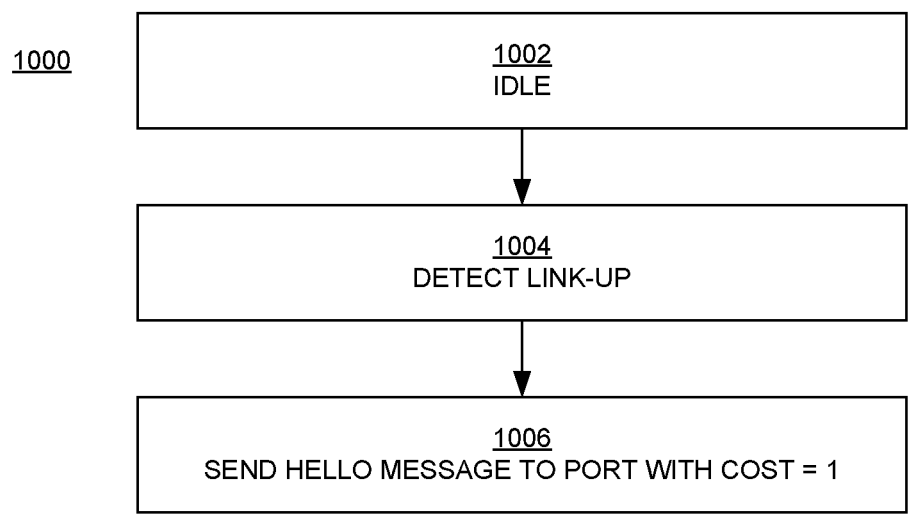
FIGS. 10, 11, 12, 13, and 14 are flowcharts of examples of operations that can be performed by a device (e.g., a switch device or an end device) in an interconnect fabric, in embodiments according to present disclosure.

In block 1002 of FIG. 10, the device is in an idle state.
In block 1004, the device detects a link-up on a port.
In block 1006, the device sends a HELLO message to the port, with a cost value of one. The device then returns to the idle state (block 1002).

Figure 11:
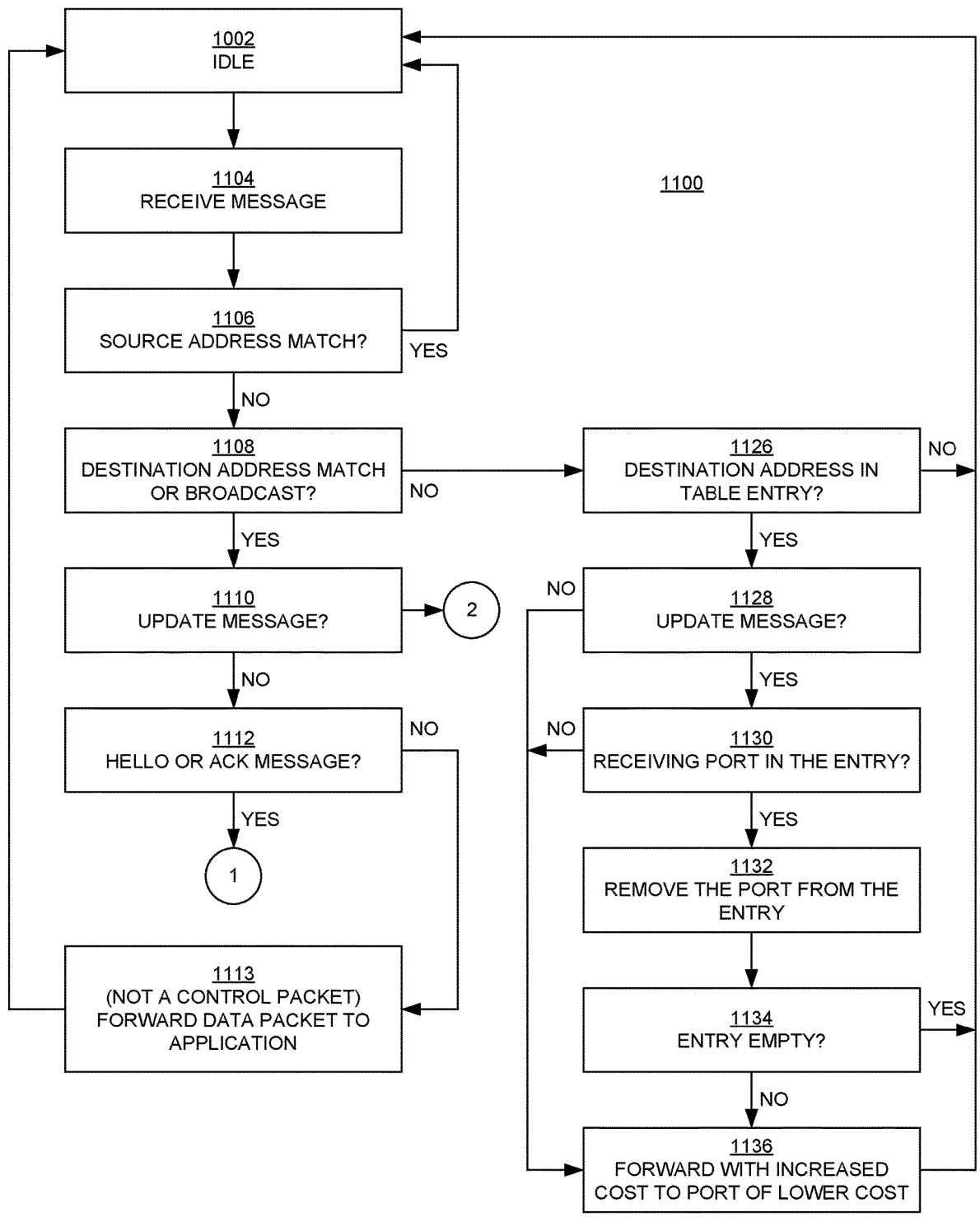

In block 1002 of FIG. 11, the device is in an idle state.
In block 1104, a message is received at a port of the device. The message includes a source address, a destination address, and a cost value.

In block 1106, a determination is made as to whether the source address in the message is the device's address. If the source address is the device's address, then the device returns to the idle state (block 1002). Otherwise, the flowchart 1100 proceeds to block 1108.

In block 1108, a determination is made as to whether the destination address is either the device's address or a broadcast address. If it is either, then the flowchart 1100 proceeds to block 1110. If it is not either, then the flowchart 1100 proceeds to block 1126.

Figure 13:
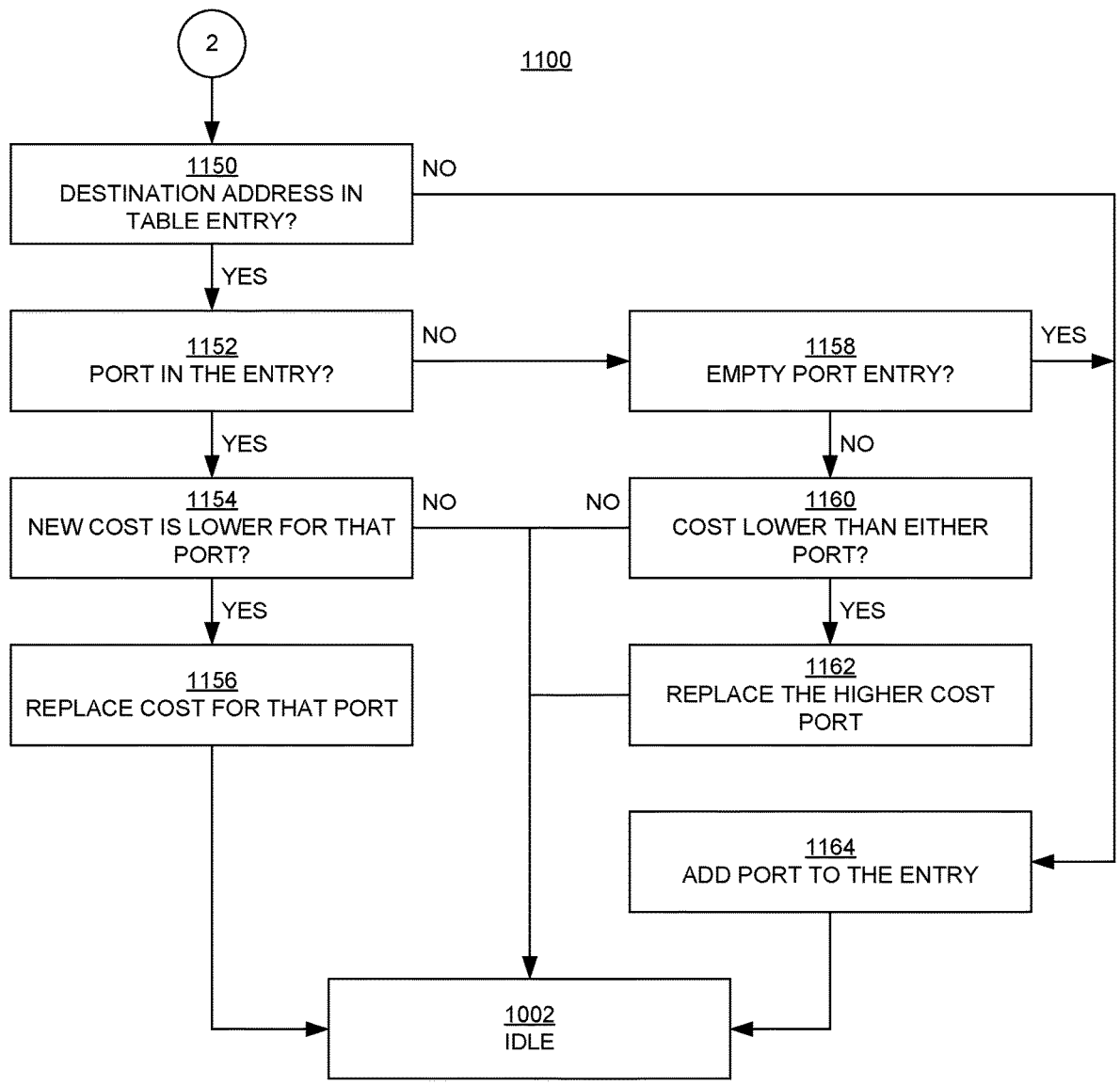

In block 1110, a determination is made as to whether the message is an UPDATE message. If it is, then the flowchart 1100 proceeds to block 1150 (FIG. 13). If it is not, then the flowchart 1100 proceeds to block 1112.

Figure 12:
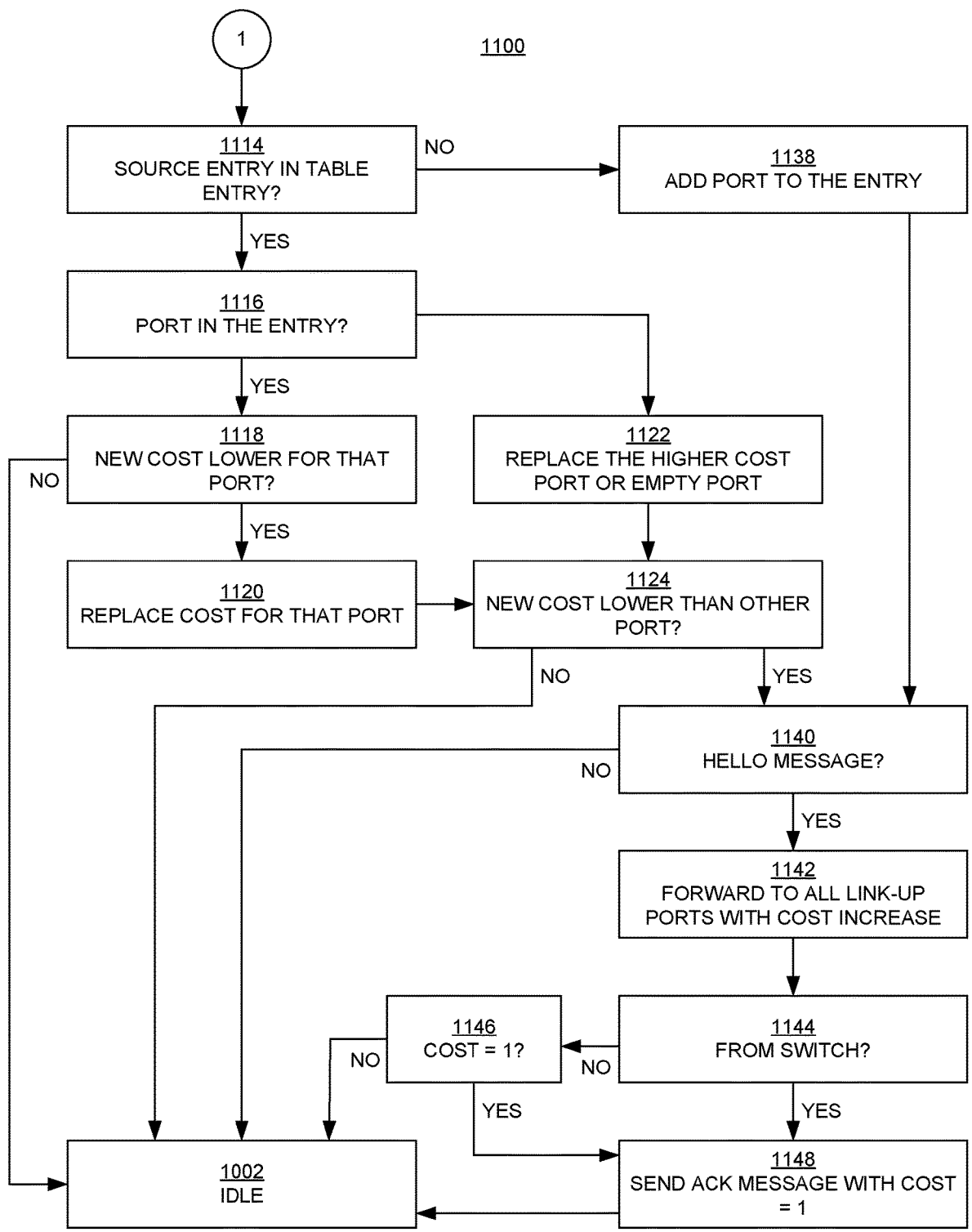

In block 1112 of FIG. 11, a determination is made as to whether the message is a control packet (either a HELLO message or an ACK message). If it is either (if it is a control packet), then the flowchart 1100 proceeds to block 1114 (FIG. 12). If it is not either (if it is not a control packet; e.g., it is a data packet), then the flowchart 1100 proceeds to block 1113.

In block 1113 of FIG. 11, the message is forward to an application. The device then returns to the idle state (block 1002).

In block 1114 of FIG. 12, a determination is made as to whether the source address in the message is an address that is included as an address entry in the device's mapping table. If it is, then the flowchart 1100 proceeds to block 1116. If it is not, then the flowchart 1100 proceeds to block 1138.

In block 1116, a determination is made as to whether the address entry in the device's mapping table corresponding to the source address in the message includes the port that received the message (see block 1104). If not, then the flowchart 1100 proceeds to block 1122. If it does, then the flowchart proceeds to block 1118.

In block 1118, a determination is made as to whether the address entry in the device's mapping table corresponding to the source address in the message includes a cost value that is lower than the cost value in the message. If not, then the device returns to the idle state (block 1002). If it does, then the flowchart 1100 proceeds to block 1120.

In block 1120, the cost value associated with that address entry in the mapping table is replaced with the cost value in the message, and the flowchart 1100 proceeds to block 1124.

In block 1122 (from block 1116), the port is added to the device's mapping table, as a port entry associated with the address entry. If the mapping table includes an empty port entry associated with the address corresponding to the source address in the message, then the port can be added in that empty port entry. If the mapping table does not include such an empty port entry, then the port can replace a port entry associated with that address entry that has a higher cost value then the cost value in the message.

In block 1124, a determination is made as to whether the cost value added to the mapping table (in block 1120 or 1122) is the lowest cost in the mapping table entry corresponding to the source address in the message. If it is, then the flowchart 1100 proceeds to block 1140. If it is not, then the device returns to the idle state (block 1002).

Returning to FIG. 11, in block 1126, a determination is made as to whether the destination address in the message corresponds to an address that is an address entry in the device's mapping table. If it is not, then the device returns to the idle state (block 1002). If it is, then the flowchart 1100 proceeds to block 1128.

In block 1128, a determination is made as to whether the message is an UPDATE message. If it is not, then the flowchart proceeds to block 1136. If it is, then the flowchart 1100 proceeds to block 1130.

In block 1130, a determination is made as to whether a port entry for the port that received the message is associated with the address entry in the device's mapping table that includes the address corresponding to the destination address in the message. If not, then the flowchart proceeds to block 1136. If it does, then the flowchart 1100 proceeds to block 1132.

In block 1132, that port is removed from the port entry.

In block 1134, if the mapping table entry is now empty, then the device returns to the idle state (block 1002). If it is not empty, then the flowchart 1100 proceeds to block 1136.

In block 1136, the cost value is increased (e.g., incremented by one), and the message with the increased cost value is forwarded to the port of the device that has the lowest cost among the cost values in the mapping table entry.

Returning to FIG. 12, in block 1138 (from block 1114), the port that received the message is added to the mapping table.

In block 1140 (from either block 1124 or 1138), a determination is made as to whether the message is a HELLO message. If not, then the device returns to the idle state (block 1002). If it is, then the flowchart 1100 proceeds to block 1142.

In block 1142, the cost value in the message is increased (e.g., incremented by one), and the message is forwarded to all active (link-up) ports on the device.

In block 1144, a determination is made as to whether message was received from a switch device (versus an end device). If not, then the flowchart 1100 proceeds to block 1146. If so, then the flowchart 1100 proceeds to block 1148.

In block 1146, a determination is made as to whether the cost value in the message is equal to one. If not, then the device returns to the idle state (block 1002). If it is, then the flowchart 1100 proceeds to block 1148.

In block 1148, an ACK message with a cost value of one is sent to the device that sent the message. The device then returns to the idle state (block 1002).

Referring now to FIG. 13, in block 1150 (from block 1110 of FIG. 11), a determination is made as to whether the destination address in the message corresponds to an address in an address entry in the device's mapping table. If not, then the flowchart 1100 proceeds to block 1164. If it does, then the flowchart 1100 proceeds to block 1152.

In block 1152, a determination is made as to whether a port entry for the port that received the message is associated with the address entry in the mapping table. If not, then the flowchart 1100 proceeds to block 1158. If it does, then the flowchart 1100 proceeds to bock 1154.

In block 1154, a determination is made as to whether the cost value in the message is lower than the cost value in the port entry (block 1152). If not, then the device returns to the idle state (block 1002). If it is, then the flowchart 1100 proceeds to block 1156.

In block 1156, the cost value in the port entry is updated or replaced with the cost value in the message, or a new port entry is added with the cost value in the message. The device then returns to the idle state (block 1002).

In block 1158 (from block 1152), a determination is made as to whether an empty port entry is associated with the address entry in the mapping table. If so, then the flowchart 1100 proceeds to block 1164. If not, then the flowchart 1100 proceeds to block 1160.

In bock 1160, a determination is made as to whether the cost value in the message is lower than the cost associated with the port entries associated with the address entry in the mapping table. If so, then the flowchart 1100 proceeds to block 1162. If not, then the device then returns to the idle state (block 1002).

In block 1162, the cost value in the message replaces the higher cost value of the port entries. The device then returns to the idle state (block 1002).

In block 1164 (from block 1150 or 1158), the port that received the message is added to the device's mapping table.

Thus, in embodiments according to the present disclosure, an address-port mapping table is automatically established for a first device in an interconnect fabric (e.g., a heterogeneous device interconnect fabric). In response to a link-up between a first port of the first device and a first port of a second device of the interconnect fabric a mapping table entry is added to the mapping table. The mapping table entry includes a first source address that is an address for the second device, and a first port entry associated with the first source address, where the first port entry includes an identifier of the first port of the first device and a first cost value. In response to a message from a third device of the interconnect fabric that is received at a second port of the first device after the link-up and that includes the first source address and a second cost value, a second port entry is added to the mapping table entry in some implementations. In those implementations, the second port entry includes an identifier of the second port and the second cost value. In response to a subsequent message that is received at a port of the first device and that includes the first source address and a third cost value, the third cost value is compared to the first and second cost values, and the mapping table entry is updated based on the subsequent message when the number of port entries associated with the mapping table entry is less than the maximum number prescribed for the mapping table and when the third cost value is less than the first and second cost values; otherwise, the mapping table entry is not updated.

Figure 14:
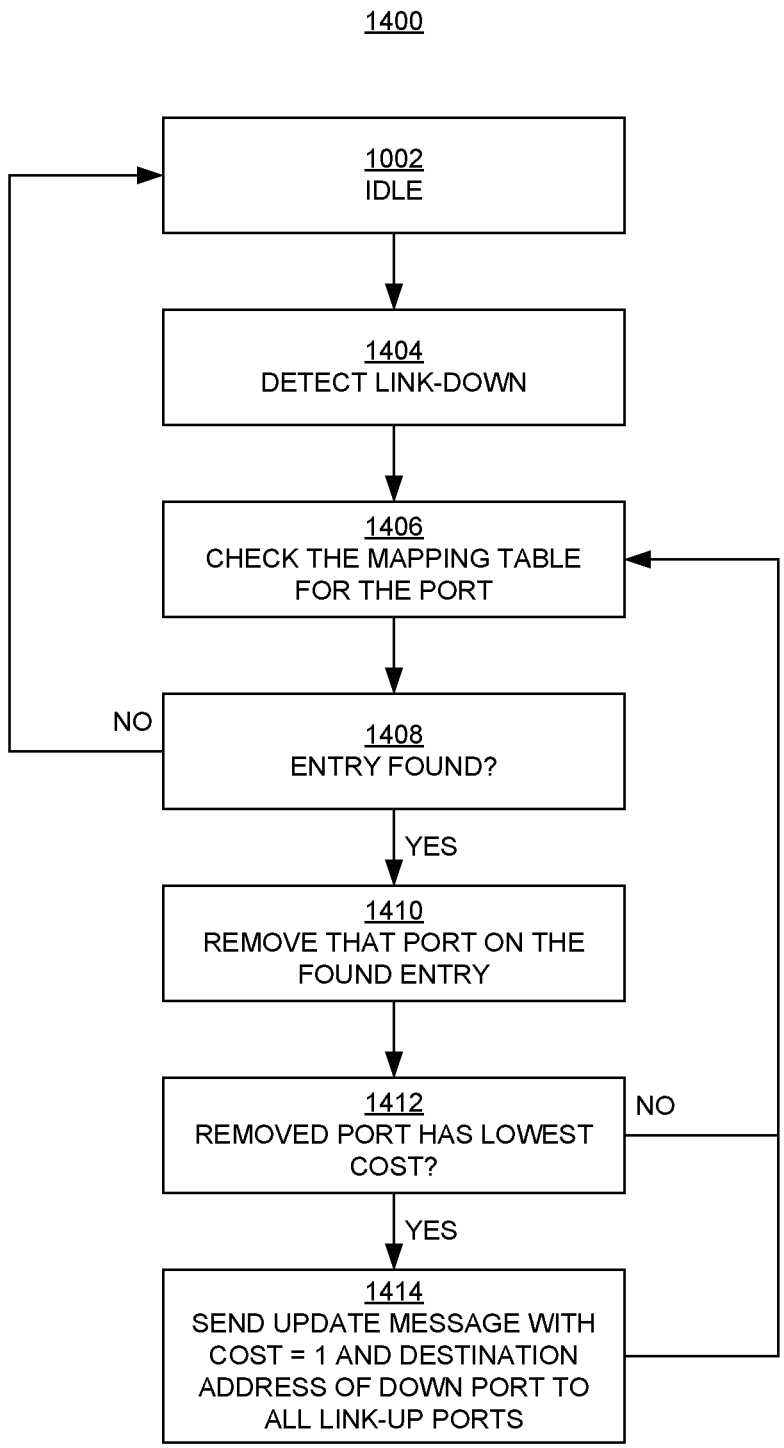

In block 1002 of FIG. 14, the device is in an idle state.

In block 1404, a link-down state or event is detected by the device.

In block 1406, the device's mapping table is checked to see if it contains a port entry associated with the port that is down.

In block 1408, if the mapping table does not include such an entry, then the device returns to the idle state (block 1002). If it does include such an entry, then the flowchart 1400 proceeds to block 1410.

In block 1410, each port entry for the down port is removed from the mapping table.

In block 1412, a determination is made with regard to whether the port entry that was removed had the lowest cost value. If not, then the flowchart 1400 returns to block 1406. If so, then the flowchart 1400 proceeds to block 1414.

In block 1414, the device sends an UPDATE message to all link-up ports, after increasing (e.g., incrementing by one) the cost value. The UPDATE message includes the increased cost value and the address in the mapping table associated with the down port.

The methods, operations, and processes described above can be included in hardware modules or apparatuses. The hardware modules or apparatus can include, but are not limited to, ASIC chips, FPGAs, Graphics Processing Units (GPUs), dedicated or shared processors that execute a particular software module or a piece of code at a particular time, and other programmable logic devices now known or later developed. When the hardware modules or apparatuses are activated, they perform the methods, operations, and processes described above.

Although the subject matter has been described in language specific to structural features and/or methodological acts, it is to be understood that the subject matter defined in the present disclosure is not necessarily limited to the specific features or acts described above. Rather, the specific features and acts described above are disclosed as example forms of implementing the present disclosure.

Embodiments according to the present disclosure are thus described. While the present disclosure has been described in particular embodiments, it should not be construed as limited by such embodiments, but rather construed according to the following claims.

What is claimed is:

1. A method for automatically establishing an address-port mapping table of a first device in an interconnect fabric of devices, the method comprising:
    in response to a link-up between a first port of the first device and a first port of a second device of the interconnect fabric of devices: adding, to the address-port mapping table, a mapping table entry comprising: a first source address that is an address of the second device and a first port entry associated with the first source address, wherein the first port entry comprises an identifier of the first port of the first device and a first cost value;
    in response to a message, comprising the first source address and a second cost value, from a third device of the interconnect fabric of devices that is received at a second port of the first device after the link-up: adding, to the mapping table entry, a second port entry comprising an identifier of the second port and the second cost value; and
    in response to a subsequent message, comprising the first source address and a third cost value, that is received at a port of the first device: comparing the third cost value to the first cost value and the second cost value, and replacing the third cost value with a lowest cost value out of the first cost value and the second cost value.

2. The method of claim 1, wherein the subsequent message received by the first device is not forwarded to another device in the interconnect fabric of devices if the third cost value is not less than at least one of the first cost value and the second cost value, to prevent a traffic loop in the interconnect fabric of devices.

3. The method of claim 1, wherein each mapping table entry of the address-port mapping table comprises:
    a source address of a device in the interconnect fabric of devices;
    a port entry associated with the source address, wherein the port entry comprises a lowest cost value for a first path to the device; and
    a different port entry also associated with the source address, wherein the different port entry comprises a next lowest cost value for a second path to the device.

4. The method of claim 1, wherein the link-up comprises:
    receiving, at the first port of the first device, a first message from the second device comprising:
    the source address of the second device, a destination address that is a broadcast address, and the first cost value; and
    sending, from the first device to the second device, in response to the first message, a second message comprising: a source address that is an address of the first device, a destination address that is a broadcast address, and the first cost value.

5. The method of claim 1, further comprising:
    increasing the first cost value; and
    sending, from the second port to the third device, a message comprising: the source address of the second device, a destination address that is a broadcast address, and the increased first cost value.

6. The method of claim 1, wherein the method further comprises:
    detecting a down-link state associated with a link between a port of the first device and a port of another device of the interconnect fabric of devices;
    in response to said detecting, identifying a mapping table entry in the address-port mapping table comprising: a source address, and a port entry comprising an identifier of the port of the first device associated with the down-link state and a cost value for the port of the first device associated with the down-link state;
    when the cost value for the port of the first device associated with the down-link state is lowest among any other cost values in the identified mapping table entry: sending from a port of the first device other than the port associated with the down-link state, to a device having the source address in the identified mapping table entry, a message comprising: a source address that is an address of the first device and the cost value for the port of the first device associated with the down-link state; and
    removing the port entry from the identified mapping table entry.

7. The method of claim 1, wherein a cost value included in the address-port mapping table is a value based on one or more values selected from the group consisting of:
    a number of hops on a path between two devices of the interconnect fabric of devices; a value based on a speed of a connection between the two devices of the interconnect fabric of devices; and
    a value based on bandwidth of a connection between the two devices of the interconnect fabric of devices.

8. A first device in an interconnect fabric of devices, the first device comprising:
a processing unit;
memory coupled to the processing unit and having stored therein an address-port mapping table; and
a plurality of ports including a first port and a second port;
wherein the processing unit is configured to:
in response to a link-up between the first port of the first device and a first port of a second device of the interconnect fabric of devices: add a mapping table entry to the address-port mapping table, the mapping table entry comprising a first source address that is an address of the second device and a first port entry associated with the first source address, wherein the first port entry comprises an identifier of the first port of the first device and a first cost value;
in response to a message, comprising the first source address and a second cost value, from a third device of the interconnect fabric of devices that is received at the second port of the first device after the link-up: add a second port entry to the mapping table entry, the second port entry comprising an identifier of the second port and the second cost value; and
in response to a subsequent message, comprising the first source address and a third cost value that is received at a port of the first device: compare the third cost value to the first cost value and the second cost value and updating the mapping table entry based on the subsequent message when a number of port entries associated with the mapping table entry is less than a maximum number and the third cost value is less than the first cost value and the second cost value, wherein otherwise the mapping table entry is not updated,
wherein the third cost value is replaced with a lowest cost value out of the first cost value and the second cost value.

9. The first device of claim 8, wherein the subsequent message received by the first device is not forwarded to another device in the interconnect fabric of devices if the third cost value is not less than at least one of the first cost value and the second cost value, to prevent a traffic loop in the interconnect fabric of devices.

10. The first device of claim 8, wherein each mapping table entry of the address-port mapping table comprises:
a source address of a device in the interconnect fabric of devices;
a port entry associated with the source address, wherein the port entry comprises a lowest cost value for a first path to the device; and
a different port entry also associated with the source address, wherein the different port entry comprises a next lowest cost value for a second path to the device.

11. The first device of claim 8, wherein the link-up comprises:
receiving, at the first port of the first device, a first message from the second device comprising: the source address of the second device, a destination address that is a broadcast address, and the first cost value; and
sending, from the first device to the second device, in response to the first message, a second message comprising: a source address that is an address of the first device, a destination address that is a broadcast address, and the first cost value.

12. The first device of claim 8, wherein the processing unit is further configured to:
increase the first cost value; and
send, from the second port to the third device, a message comprising: the source address of the second device, a destination address that is a broadcast address, and the increased first cost value.

13. The first device of claim 8, wherein the processing unit is further configured to:
detect a down-link state associated with a link between a port of the first device and a port of another device of the interconnect fabric of devices;
in response to the detecting the down-link state, identify a mapping table entry in the address-port mapping table comprising: a source address, and a port entry comprising an identifier of the port of the first device associated with the down-link state and a cost value for the port of the first device associated with the down-link state;
when the cost value for the port of the first device associated with the down-link state is lowest among any other cost values in the identified mapping table entry: send from a port of the first device other than the port associated with the down-link state, to a device having the source address in the identified mapping table entry, a message comprising: a source address that is an address of the first device and the cost value for the port of the first device associated with the down-link state; and
remove the port entry from the identified mapping table entry.

14. The first device of claim 8, wherein a cost value included in the address-port mapping table is a value based on one or more values selected from the group consisting of:
a number of hops on a path between two devices of the interconnect fabric of devices;
a value based on a speed of a connection between the two devices of the interconnect fabric of devices; and
a value based on bandwidth of a connection between the two devices of the interconnect fabric of devices.

* * * * *